United States Patent [19]
Pringle

[11] Patent Number: 5,259,195
[45] Date of Patent: Nov. 9, 1993

[54] FLUID PRESSURE INTENSIFIER

[76] Inventor: William L. Pringle, 999 Lakeshore Rd., Grosse Pointe Shores, Mich. 48236

[21] Appl. No.: 909,598

[22] Filed: Jul. 7, 1992

[51] Int. Cl.⁵ .............................. B60T 7/00; F15B 7/00
[52] U.S. Cl. ........................................ 60/567; 60/581; 303/62
[58] Field of Search ...................... 60/547.1, 578, 579, 60/580, 581, 567, 574; 303/62

[56] References Cited

U.S. PATENT DOCUMENTS

| | | | |
|---|---|---|---|
| 2,396,539 | 3/1946 | Smith et al. | 60/583 |
| 4,026,109 | 5/1977 | Fay | 60/581 |
| 4,255,930 | 3/1981 | Natalie | 60/581 X |
| 4,512,151 | 4/1985 | Yamatani | 60/581 |
| 4,798,052 | 1/1989 | McAfee | 60/579 X |
| 4,961,317 | 10/1990 | Wolfbauer, III | 60/567 X |
| 5,107,681 | 4/1992 | Wolfbauer, III | 60/567 X |

*Primary Examiner*—Edward K. Look
*Assistant Examiner*—Hoang Nguyen
*Attorney, Agent, or Firm*—Reising, Ethington, Barnard, Perry & Milton

[57] ABSTRACT

The subject invention relates to a fluid pressure intensifier (32) for increasing the pressure of an incompressible fluid and comprises a fluid reservoir (112) supplying fluid to a cylinder housing (72). The housing (72) includes first inlet (88) and outlet (90) cylinders extending between opposite ends (74,76) of the housing (72) and slideably receiving first inlet (96) and outlet (100) pistons therein. Second inlet (92) and outlet (94) cylinders are spaced parallel to the first cylinders (88,90) and further extend between the housing ends (74,76) for slideably receiving second inlet (98) and outlet (102) pistons therein. The first pistons (96,100) are forced in unison axially through the housing (72) to increase the pressure of the hydraulic fluid in the first outlet cylinder (90). A fluid channel (156) allows passage of the fluid from the first outlet cylinder (90) to the second inlet cylinder (92) and thus forces the second pistons (98, 102) in unison in opposing directions through the housing (72) to further increase the pressure of the fluid in the second smaller outlet cylinder (94). The fluid is then expelled from the housing (72) through an outlet (151) to an actuating device.

24 Claims, 9 Drawing Sheets

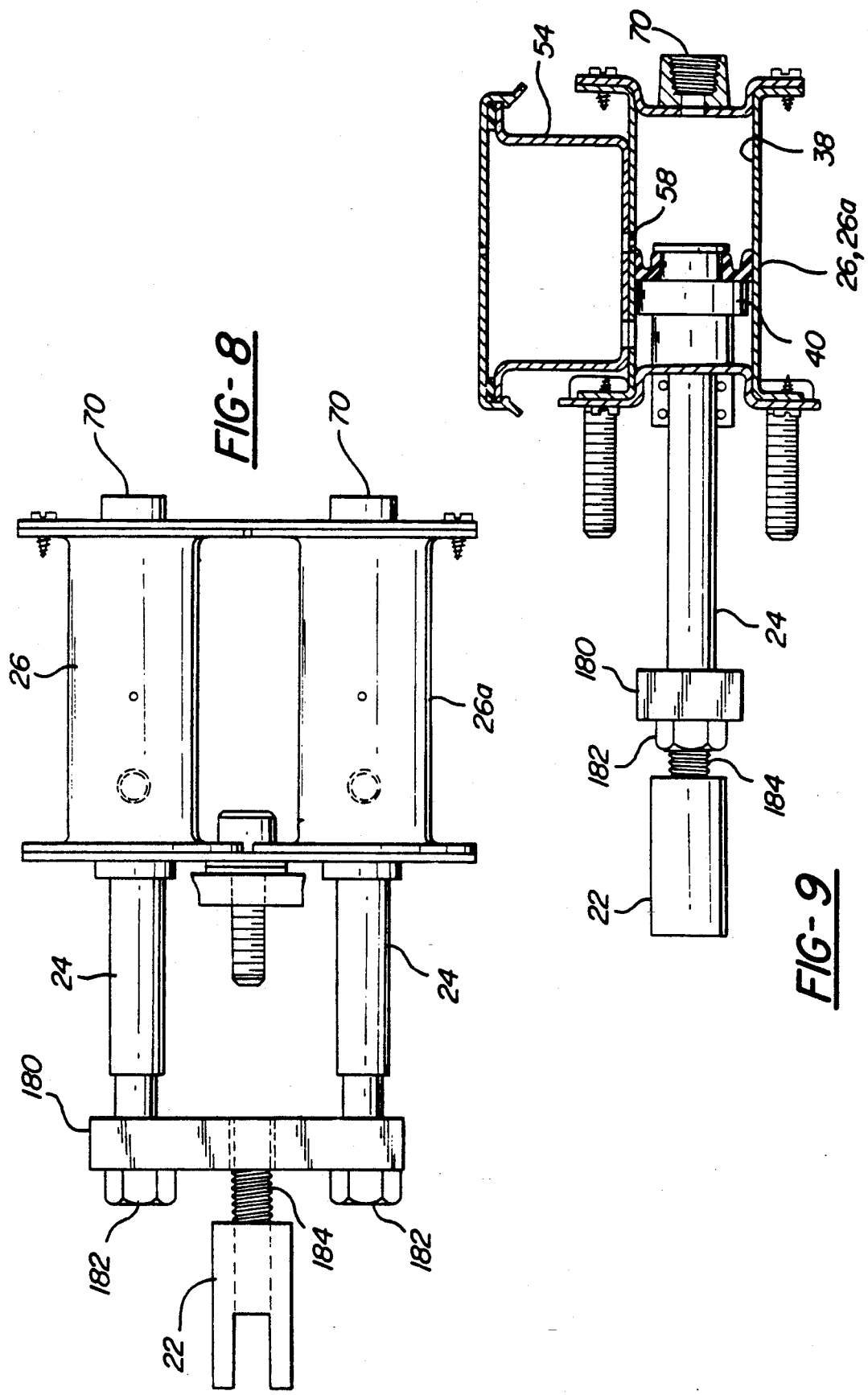

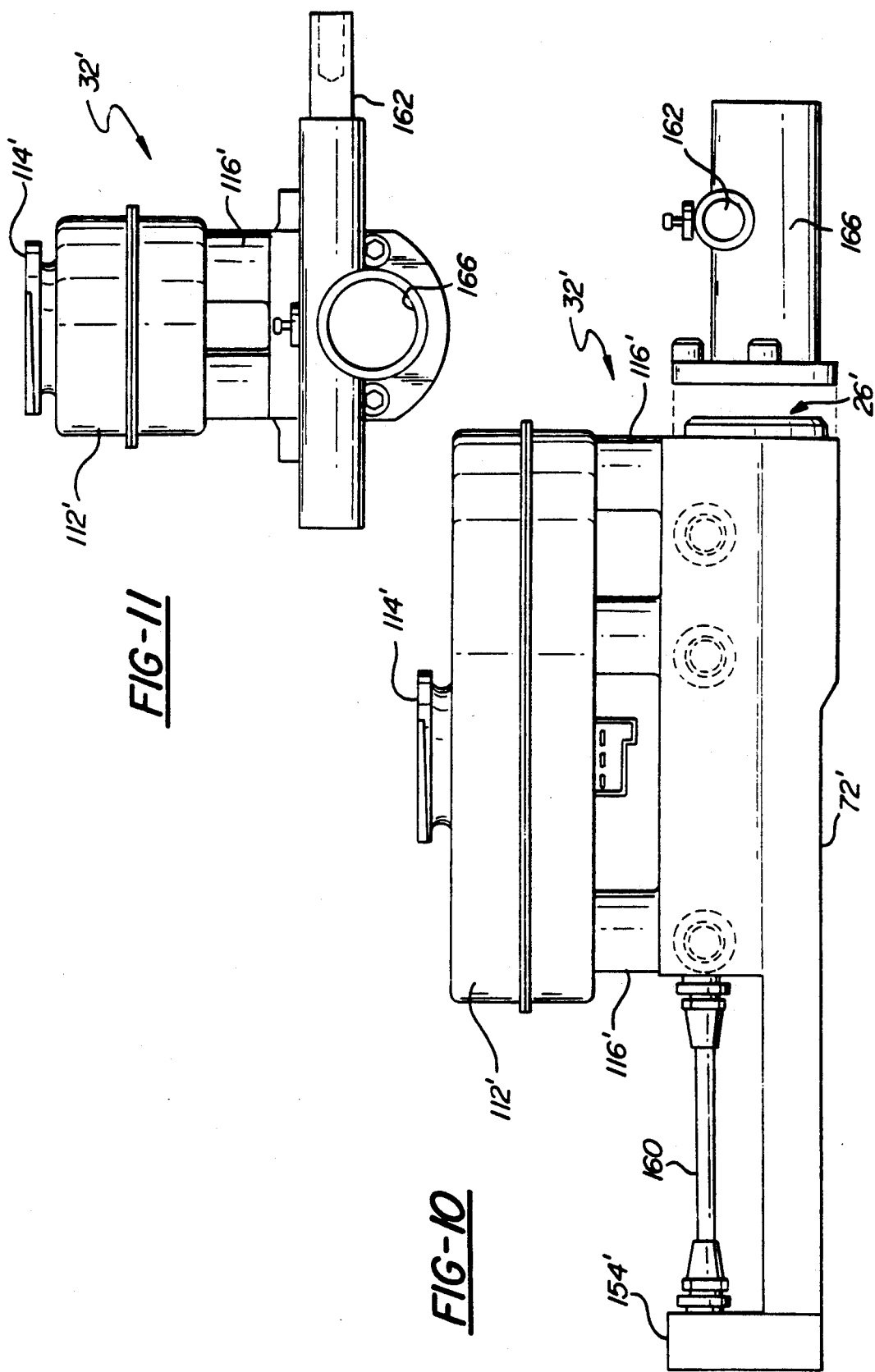

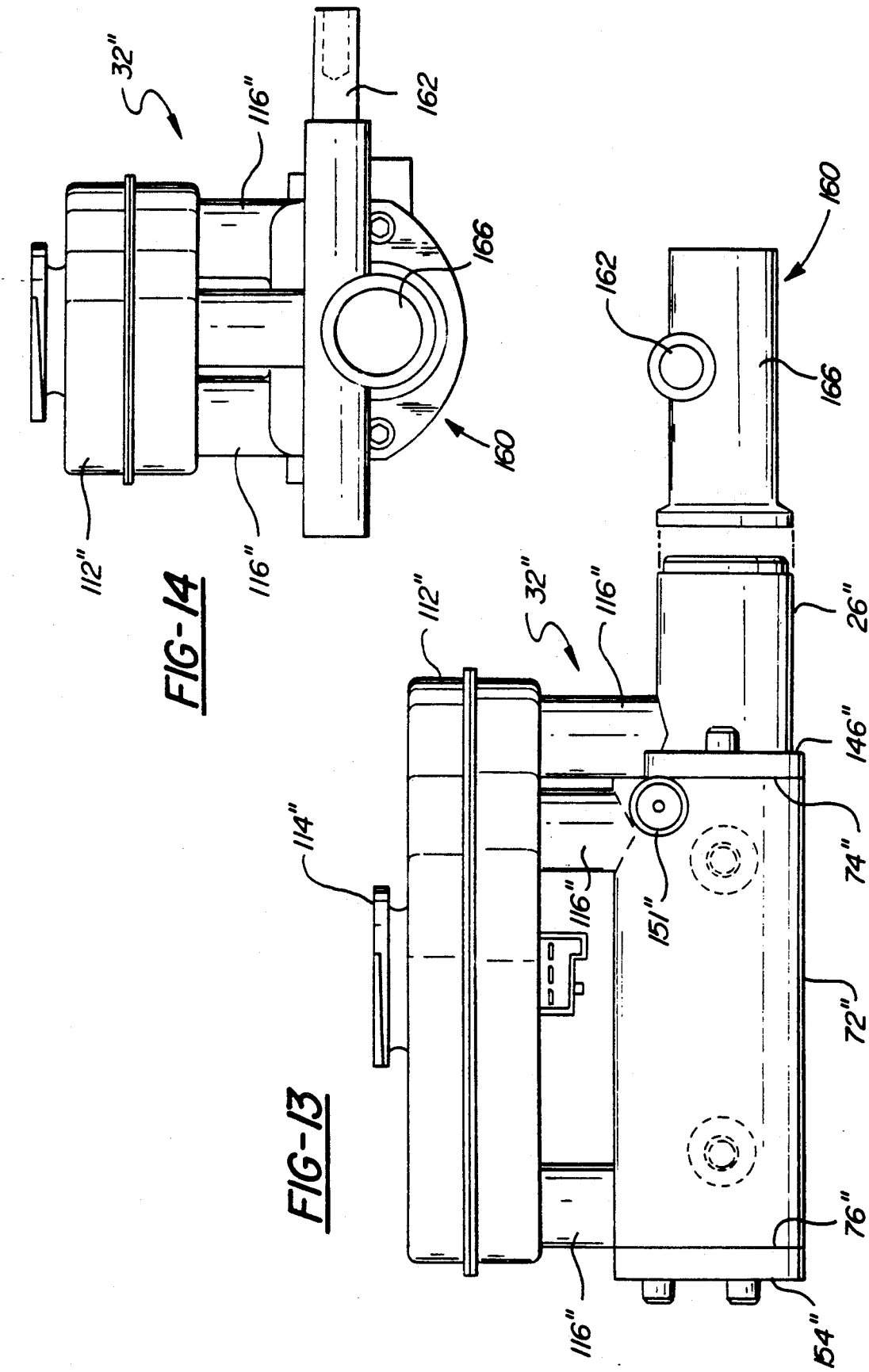

FLUID PRESSURE INTENSIFIER

TECHNICAL FIELD

The subject invention relates generally to a fluid pressure intensifier, and more specifically, to a fluid pressure intensifier used in combination with a master operating cylinder of a manual braking assembly to increase the pressure of an incompressible fluid.

BACKGROUND OF THE INVENTION

By way of background, passenger cars and light trucks generally incorporate a hydraulic brake system including a master hydraulic operating cylinder actuated by the compression of the vehicle brake pedal to supply pressurized hydraulic fluid to a brake assembly at each vehicle wheel. A vast majority of vehicles incorporate a vacuum chamber in combination with the master hydraulic operating cylinder for use as a pressure booster or intensifier. The vacuum generally consists of a tank or housing which interconnects with the vehicle engine to create a vacuum within the tank as is commonly known in automotive power brake systems. When the brake pedal is depressed, the vacuum supplies a pressure amplification to the master operating cylinder to create a sufficient hydraulic brake fluid pressure for vehicle deceleration. However, creation of the vacuum requires that the engine be running. Therefore, with the sudden failure of engine power, the vacuum would fail to provide an increased pressure source from the brake pedal to the master operating cylinder, thus creating difficult if not impossible vehicle braking.

As an alternative, vehicle brake systems may incorporate a standard braking system including a manual hydraulic brake booster or intensifier which relies on the vehicle operator's brake pedal pressure for increasing the brake fluid pressure. Generally the intensifier includes a plurality of actuating piston and cylinder arrangements housed in the master operating cylinder which force the fluid through a pressure boosting chamber.

For example, U.S. Pat. No. 3,393,510 to Kinsey, issued Jul. 23, 1968, discloses a manual hydraulic brake system including a master operating cylinder for pressurizing hydraulic brake fluid and forcing the pressurized fluid through a plurality of fluid lines to a wheel brake assembly. The master cylinder comprises a housing containing a first master piston and cylinder arrangement actuated by brake pedal force. The master cylinder housing further encloses a secondary cylinder in fluid communication with the master cylinder and encompassing a floating secondary piston. A fluid reservoir supplies hydraulic fluid through fluid passageways to each of the cylinders. In operation, the vehicle occupant depresses the brake pedal to actuate the master piston and force the hydraulic brake fluid from the master cylinder to the secondary piston/cylinder arrangement. The secondary piston is subsequently forced into the secondary cylinder and forces the hydraulic fluid through an outlet in the master cylinder housing to a brake fluid line to supply the pressurized fluid to each wheel brake assembly. The secondary piston and cylinder arrangement has a smaller area and fluid volume capacity as compared to the master piston and cylinder arrangement thus providing an increase in fluid pressure as the fluid is acted upon by the series of pistons and forced through the respective cylinders.

Similarly, U.S. Pat. No. 1,897,230 to Bowen, issued Feb. 14, 1933, discloses a manual hydraulic braking system including a master housing encompassing a master piston and cylinder arrangement actuated by depression of a brake pedal. The housing includes a fluid reservoir for supplying fluid to the master cylinder. Upon depression of the brake pedal, the master piston is forced axially along the cylinder to force the hydraulic fluid through an outlet in the master cylinder. The master cylinder outlet is in fluid communication with a fluid channel leading to a secondary piston and cylinder arrangement also enclosed within the master housing. The hydraulic fluid exiting the master cylinder actuates the secondary piston to force the piston axially along the secondary cylinder. The secondary piston and cylinder arrangement has a cylinder area less than the area of the master piston and cylinder arrangement to thereby decrease the volume of fluid flow and thus increase the pressure of the hydraulic fluid as the fluid flows from the master cylinder to the secondary cylinder. The hydraulic fluid is then forced through an outlet in the secondary cylinder and supplied via a brake line to a wheel braking assembly.

As can be appreciated, the addition of a secondary piston and cylinder arrangement within the housing of the master operating cylinder greatly increases the size and fluid volume requirements within the housing to the extent that the master operating cylinder becomes cumbersome and space consuming within the vehicle engine compartment. Furthermore, the master operating cylinder is generally mounted to the firewall within the vehicle engine compartment to provide for direct in-line attachment with the brake pedal linkage. Due to the increased size and weight of the master cylinder, because of the secondary piston and cylinder arrangements, it becomes difficult to assemble and mount the master operating cylinder to the firewall. Furthermore, with the elimination of the power vacuum pump preceding the master operating cylinder, the brake pedal force and travel required upon depression greatly increases to provide sufficient fluid pressure for vehicle braking.

SUMMARY AND ADVANTAGES OF THE INVENTION

In accordance with the present invention there is provided a fluid pressure intensifier for increasing the pressure of an incompressible fluid comprising a housing having a longitudinal axis extending between first and second ends for conveying fluid therethrough and mounting means for mounting the housing to a vehicle. The intensifier further includes a first bore parallel to the longitudinal axis and extending between the first and second ends and including an inlet cylinder extending axially from the first end and an outlet cylinder extending axially from the inlet cylinder to the second end, the inlet cylinder having a diameter larger than the diameter of the outlet cylinder. Similarly, a second bore is spaced from and parallel to the first bore and extends between the first and second ends. The second bore includes an inlet cylinder extending axially from the second end and an outlet cylinder extending axially from the inlet cylinder to the first end, the inlet cylinder having a diameter larger than the diameter of the outlet cylinder. An inlet piston is slideably received in each of the inlet cylinders, and an outlet piston is slideably received in each of the outlet cylinders. A fluid reservoir stores incompressible fluid therein and a conduit provides passage of the fluid from the fluid reservoir to each of the cylinders. Still further, the intensifier includes a first end cap for closing the first end of the housing and including an inlet in fluid communication with the inlet cylinder of the first bore. A second end cap closes the second end of the housing and includes a channel for providing a fluid passageway between the outlet cylinder of the first bore and the inlet cylinder of the second bore. Finally, the intensifier includes an outlet in fluid communication with the outlet cylinder of the second bore for discharging the pressurized fluid from the intensifier.

Therefore, the subject invention incorporates a manual hydraulic brake intensifying system relying on the brake pedal force to increase the pressure of hydraulic brake fluid supplied to the wheel assembly for proper vehicle braking. The subject invention incorporates a brake intensifying system in an independent unit, remote from the master operating cylinder. That is, a master operating piston and cylinder arrangement, as commonly known in the art, is used in direct connection with the brake pedal linkage, and an independent hydraulic brake intensifying unit is positioned subsequent or down stream of the master operating cylinder and in fluid communication therewith via a brake fluid line. The intensifier, therefore, may be mounted anywhere on the vehicle where the a fluid reservoir may be accessible for fluid level checking or refill. Furthermore, the master operating cylinder supplies pressurized braking fluid to the brake intensifying system thus reducing the required brake pedal travel and force. The brake intensifying system includes a plurality of inlet and outlet piston and cylinder arrangements of decreasing area and fluid volume, passing in series through a fluid housing, to increase the hydraulic fluid pressure as it passes therethrough. Furthermore, the hydraulic intensifying system incorporates decreasingly tapered cylinder walls to further assist in the increase of fluid pressure in the system.

FIGURES IN THE DRAWINGS

Other advantages of the present invention will be readily appreciated as the same becomes better understood by reference to the following detailed description when considered in connection with the accompanying drawings wherein:

FIG. 8 is a top view of the vehicle brake pedal linkage interconnected with a pair of master operating cylinders;

FIG. 9 is a cross-sectional side view of the master operating cylinder of FIG. 8;

FIG. 10 is a side view of yet another alternative embodiment of the subject invention including an integral master operating cylinder and fluid pressure intensifier assembly for use in a cross-mount type vehicle engine compartment;

FIG. 11 is an end view of the alternative embodiment of FIG. 10;

FIG. 13 is a side view of yet another alternative embodiment of the subject invention;

FIG. 14 is an end view of the alternative embodiment of FIG. 13; and

DETAILED DESCRIPTION OF THE DRAWINGS

Figure 1:
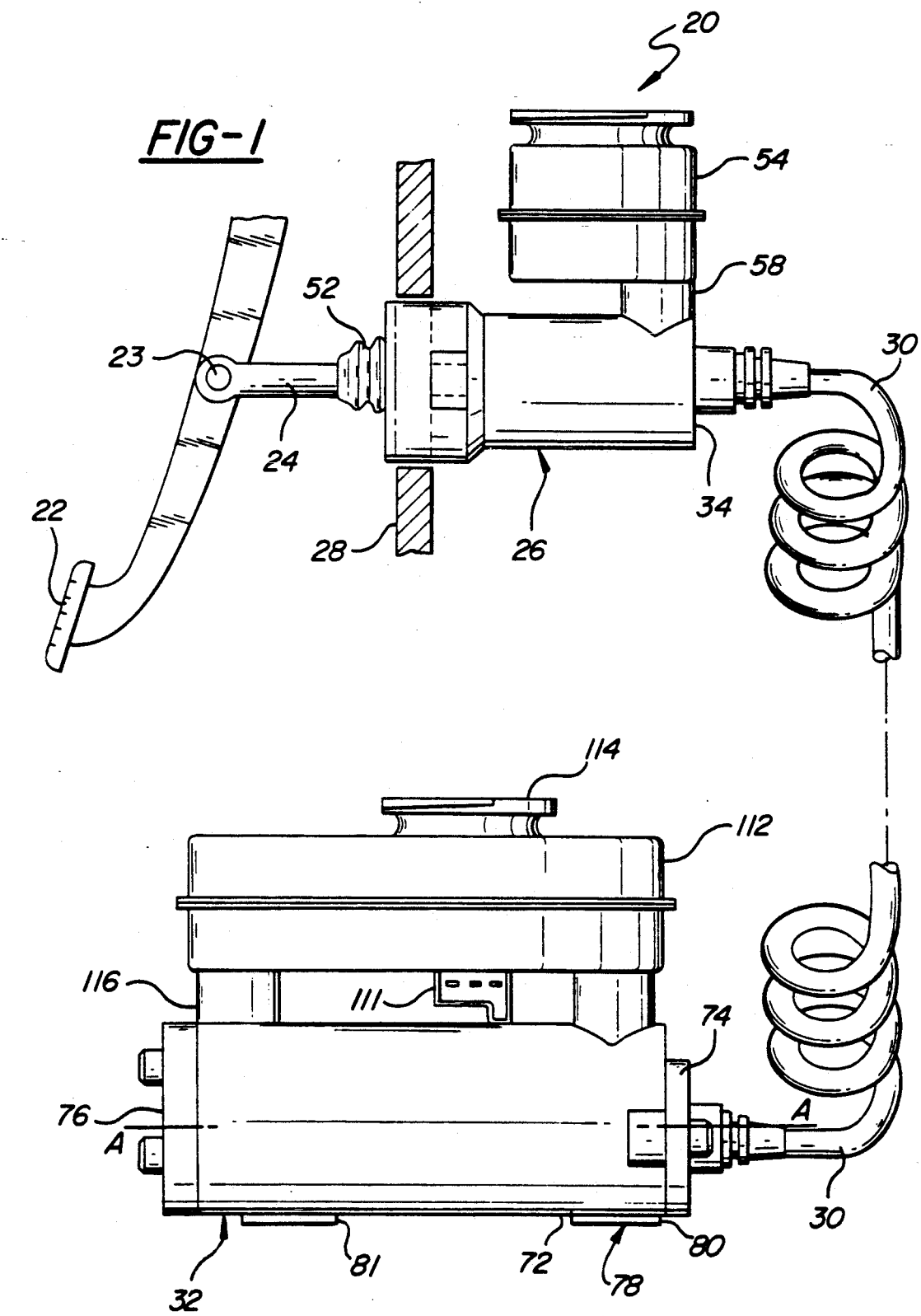
FIG. 1 is a side view of a vehicle brake pedal and master operating cylinder in fluid communication with a fluid pressure intensifier according to the subject invention.

Referring to the Figures wherein like numerals indicate like or corresponding parts throughout the several views, FIG. 1 discloses a manual brake system generally indicated at 20 for supplying pressurized brake fluid to wheel assemblies (not shown) of an automotive vehicle. The manual brake system 20 includes a brake pedal lever 22 pivotally attached at 23 to a brake push rod 24. The brake push rod 24 is slideably received in a master hydraulic operating cylinder generally indicated at 26. The master operating cylinder 26 is mounted by any suitable means, i.e. fasteners including bolts, screws, rivets, weld, etc., to the vehicle firewall 28 which creates a barrier between the vehicle passenger compartment and engine compartment as is commonly known in the art. The brake system 20 further includes at least one resilient brake fluid line 30 in fluid communication with the master operating cylinder 26 and interconnected to a fluid pressure intensifier in accordance with the subject invention as generally indicated at 32.

Figure 2:
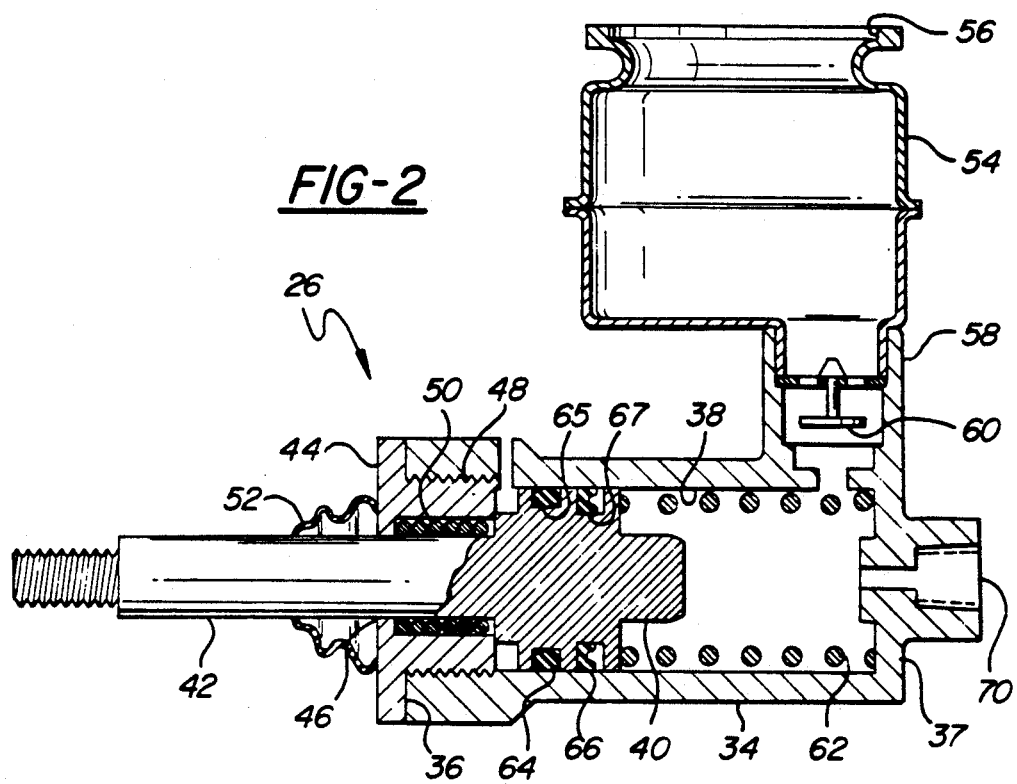
FIG. 2 is a cross-sectional side view of the master operating cylinder of FIG. 1.

Referring to FIG. 2, the master operating cylinder 26 is shown more specifically including a cylindrical housing 34 having a longitudinal axis extending between first 36 and second 37 housing ends. A master cylinder bore 38 extends axially between the first 36 and second 37 ends and receives a floating master operating piston 40 therein. The master piston 40 includes a cylindrical plunger 42 extending axially through the first end 3 of the housing 40 and interconnected with the brake push rod 24. The first end 36 is closed by an end cap 44 including a bore 46 for slideably receiving the plunger 42 therethrough. The end cap 44 includes an integral threaded nut portion 48 to threadably fasten the end cap 44 to the first end 36. Further, the end cap 44 includes a press fit bearing 50 to provide efficient minimum frictional sliding contact between the plunger 42 and the bore 46 of the end cap 44. The end cap 44 further includes a resilient rubber-like boot 52 to provide a seal against dirt and debris about the perimeter of the plunger 42.

Also shown in FIG. 2, the master operating cylinder 26 further includes a fluid reservoir 54 having an opening 56 therein for receiving and storing an incompressible hydraulic fluid, such as any standard hydraulic brake fluid commonly known in the industry, i.e. DOT 3 or DOT 4. The fluid reservoir 54 includes a conduit 58 to provide a passageway between the fluid reservoir 54 and the master cylinder 38. The conduit 58 generally includes a common check valve as shown at 60 for regulating the flow of fluid into the master cylinder as will be further described hereinbelow.

A coil type spring 62 is disposed within the master cylinder 38 and supported between the master piston 40 and the second end 37 of the housing 34. The spring 62 urges the master piston 40 toward the first end 36 of the cylinder 38. The master piston 40 further includes a plurality of fluid seals 64,66 for preventing the flow of incompressible fluid past the master piston 40 to the first end 36 of the housing 34. The seals include a resilient O-ring 64 seated in a circumferential channel 65 about the perimeter of the master piston 40 and a resilient packing cup 66 spaced axially from the O-ring 64 and similarly seated in a circumferential channel 67 about the master cylinder 40.

In operation of the master operating cylinder, the vehicle operator depresses the brake pedal lever 22 when vehicle braking is desired. The brake pedal lever 22 forces the brake pushrod 24 axially to actuate the master operating cylinder 26. The brake pushrod 24 forces the plunger 42 axially through bore 46 of the end cap 36. The axial force to the master piston 40 overcomes the biasing force of the spring 62 and allows the piston 40 to travel axially from the first end 36 along the master cylinder 38 towards the second end 37. The check valve 60 closes the conduit passageway 58 upon an initial increase in back pressure in the cylinder 38 and thus prevents any further fluid flow into the cylinder 38. It will be appreciated that the check valve 60 may alternatively be of the floating ball type to close of the passageway 58 in response to fluid back pressure as is commonly known in the art. Alternatively, the conduit passageway 58 may be positioned immediately to the distal downstream end of the piston 40 in the cylinder 38 or midway between the ends 36,37 of the cylinder 38 such that upon initial axial movement of the piston 40 along the cylinder 38, the passageway 58 is closed over by the piston 40 to block and prevent any further fluid flow into the cylinder 38. As is commonly known in fluid technology, as the cross-sectional area of the cylinder decreases, the incompressible hydraulic fluid flowing therethrough must increase in pressure. Therefore, as the piston 40 travels axially along the cylinder 38, causing the cross-sectional area to decrease, the fluid pressure increases and is forced towards the cylinder end 37. The pressurized fluid is then forced through an outlet 70 in the second end 37 of the master operating cylinder housing 34. The pressurized fluid passing through the outlet 70 enters the resilient flexible brake fluid line 30, as shown in FIG. 1, and passes to the fluid pressure intensifier 32 to be further described below.

Figure 3:
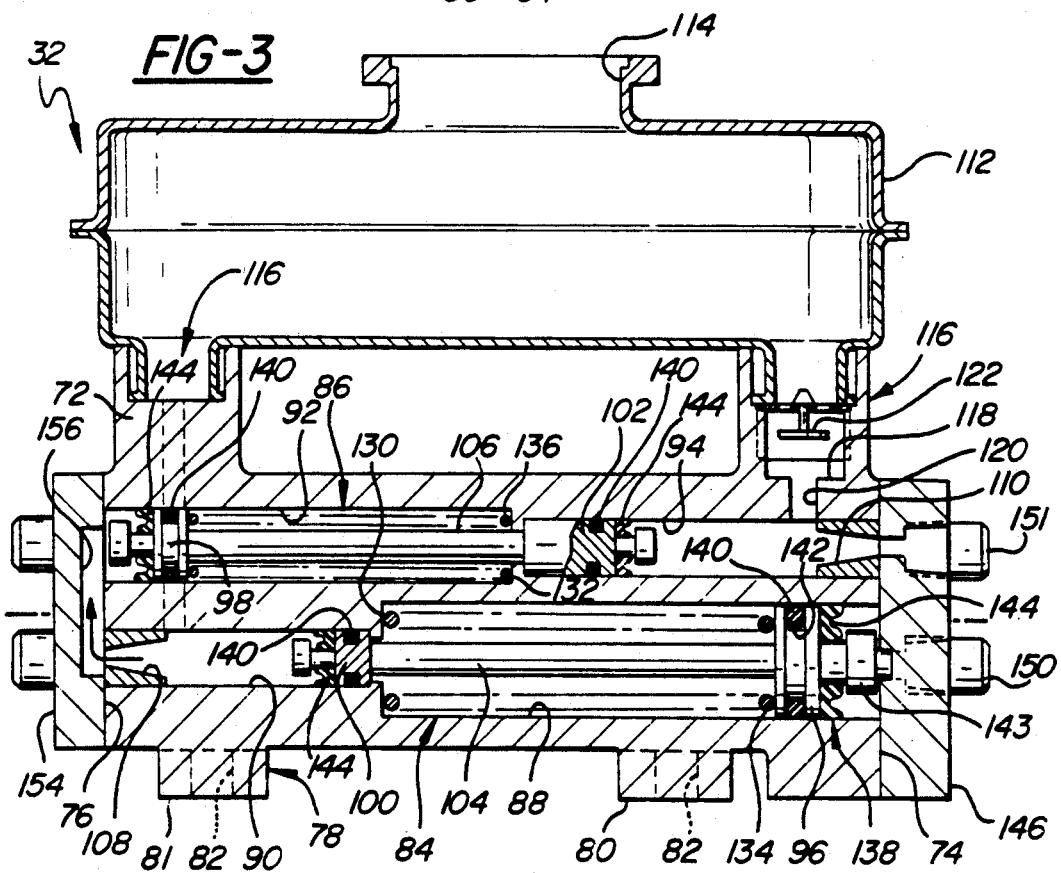
FIG. 3 is a cross-sectional side view of the fluid pressure intensifier of FIG. 1.

The subject invention relates to a fluid pressure intensifier for increasing the pressure of an incompressible fluid, i.e. DOT 3 or 4 hydraulic brake fluid or the like. Referring specifically to FIGS. 1, 3 and the very similar alternative embodiment of FIG. 4 wherein like numerals indicate like or similar parts, the fluid pressure intensifier is generally indicated at 32 and comprises housing means 72 having a longitudinal axis A—A extending between first 74 and second 76 ends for conveying the incompressible fluid therethrough. The intensifier 32 further includes mounting means 78 for mounting the housing means 72 to a vehicle. The mounting means 78 generally include a plurality of brackets or flanges 80, 8 extending outwardly from the housing 72 and having apertures 82 for receiving fasteners, such as bolts, screws, rivets, etc., therethrough for fixed attachment to a vehicle.

The housing 72 includes a first bore 84 parallel to the longitudinal axis and extending between the first 74 and second 76 housing ends. Similarly, a second bore 86 is spaced from and parallel to the first bore 8 and further extends between the first 74 and second 76 ends.

Figure 4:
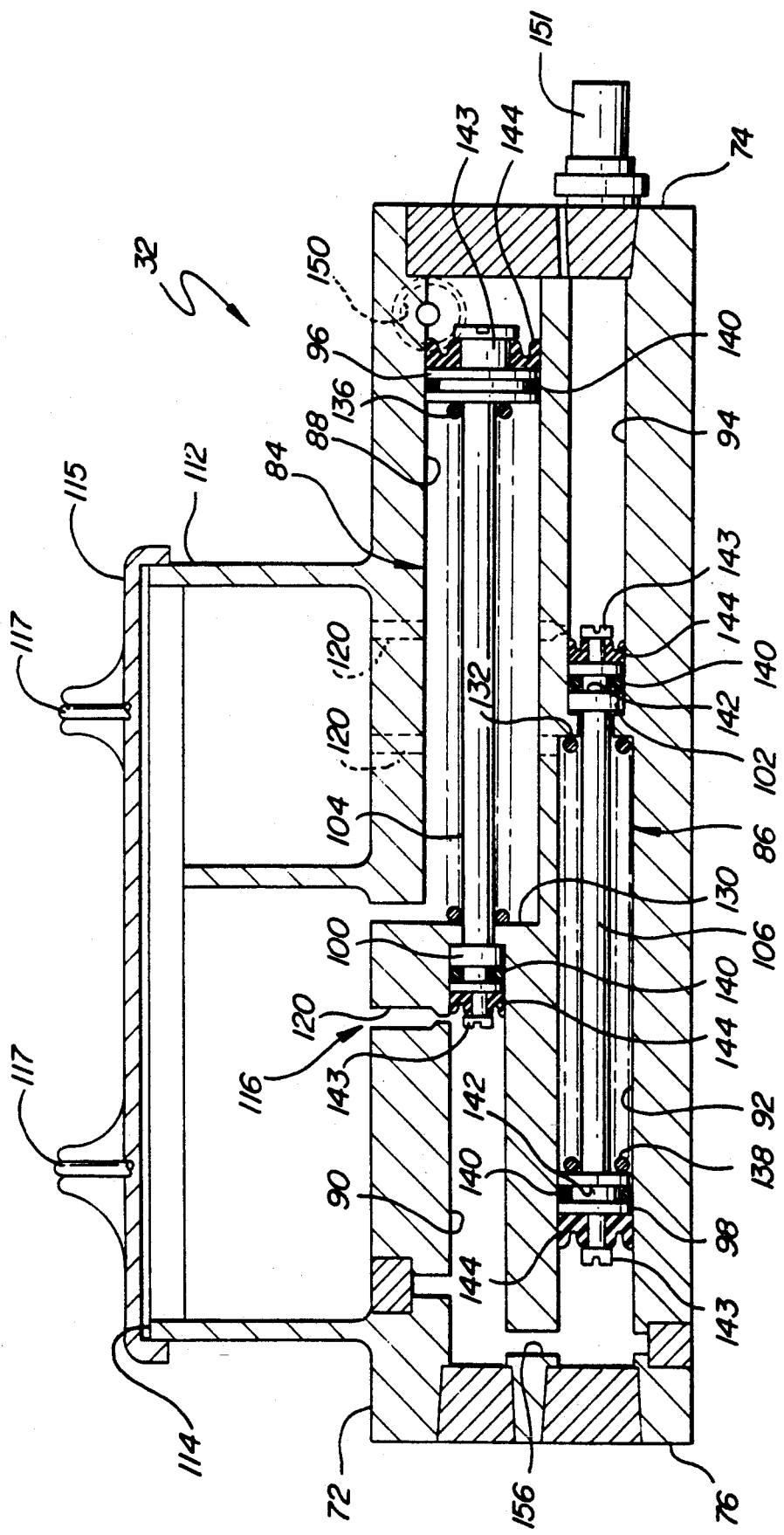
FIG. 4 is a cross-sectional side view of an alternative embodiment of a fluid pressure intensifier according to the subject invention.
Figure 5:
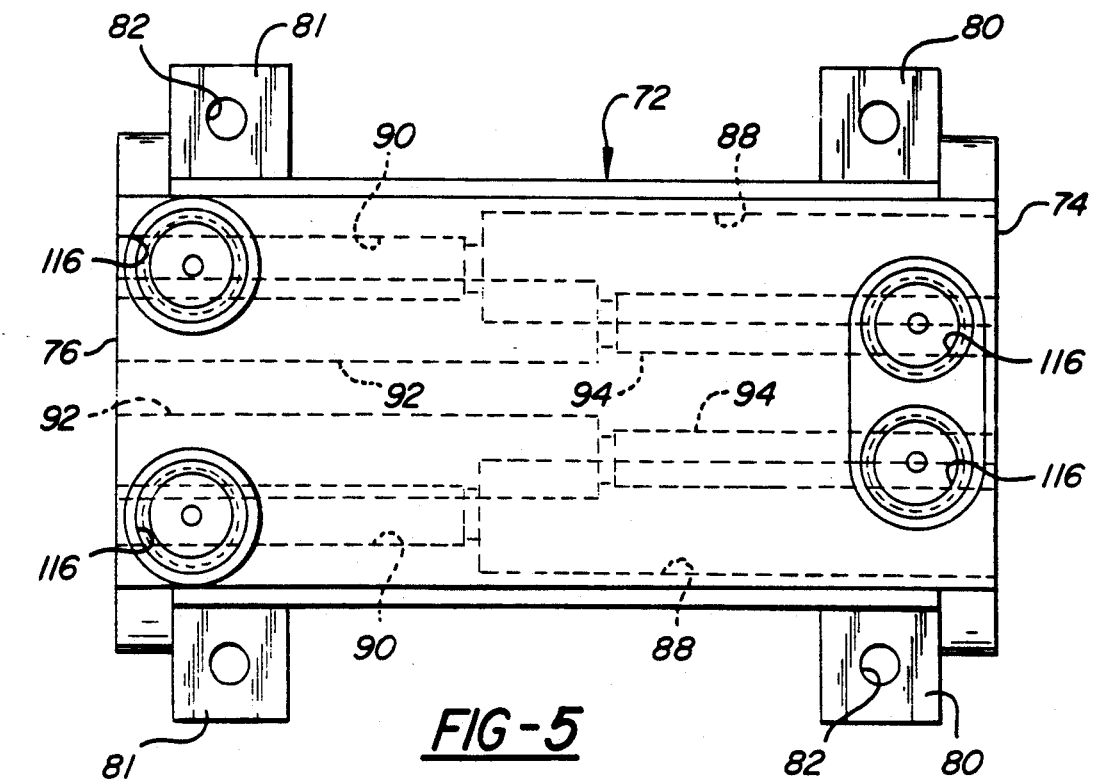
FIG. 5 is a top view of the fluid-pressure intensifier of FIG. 1 including a plurality of inlet and outlet fluid cylinders and fluid conduit passageways.

The first bore 84 includes an inlet cylinder 88 extending axially from the first housing end 74 and an outlet cylinder 90 extending axially from the inlet cylinder 88 to the second housing end 76. Similarly, the second bore 86 includes an inlet cylinder 92 extending axially from the second housing end 76 and an outlet cylinder 94 extending axially from the inlet cylinder 92 to the first housing end 74. As shown in FIGS. 3,4 and 5, the tubular inlet cylinder 88 of the first bore 84 has a diameter greater than the diameter of the outlet cylinder 90. Likewise, the tubular inlet cylinder 92 of the second bore 86 has a diameter greater than the diameter of the outlet cylinder 94.

As further shown in FIGS. 3,4 and 5, according to the preferred embodiment of the subject invention, the diameter and hence cross-sectional area of the outlet cylinders 90,94 are equal. Further the diameter and cross-sectional area of the inlet cylinder 88 of the first bore 84 is larger or greater than the diameter and cross-sectional area of the inlet cylinder 92 of the second bore 86. For example, each of the outlet cylinders 90,94 have a diameter of 0.375 inches, the inlet cylinder 88 of the first bore 84 has a diameter of 0.750 inches and the inlet cylinder 92 of the second bore 86 has a diameter of 0.500 inches.

The intensifier 32 further includes a generally disc-shaped inlet piston 96 slidably received in the inlet cylinder 88 of the first bore 84 and a similar disc-shaped inlet piston 98 slidably received in the inlet cylinder 92 of the second bore 86. Further, a disc-shaped outlet piston 100 is slideably received in the outlet cylinder 90 of the first bore 84 and a second disc-shaped outlet piston 102 is slidable received in the outlet cylinder 94 of the second bore 86. As is further appreciated, the outlet pistons 100,102 each have the same diameter and cross-sectional area; i.e. 0.375 inches in diameter. The inlet piston 88 of the first bore 84, however, has a larger diameter and cross-sectional area; i.e. 0.750 inches in diameter, and the inlet piston 98 of the second bore 86 has a smaller diameter than the inlet piston 88, but, a larger diameter than the outlet piston 100; i.e. 0.500 inches in diameter.

More particularly, as is well known in fluid technology, fluid pressure is inversely proportional to the cross-sectional area over which a force is exerted thereon. Therefore, a pressure amplification or intensification occurs upon fluid exerted by a force from the inlet piston 96 to the smaller outlet piston 100 and a further amplification from the inlet piston 98 to the smaller outlet piston 102. Therefore, the incompressible fluid has a pressure increase or amplification twice as it passes through the brake intensifier 32; once in the first bore 84 and a second time in the second bore 86.

The inlet piston 96 and outlet piston 100 of the first bore 84 are interconnected by a longitudinally extending cylindrical connecting rod 104. Similarly the inlet piston 98 and the outlet piston 102 of tee second bore 86 are interconnected by a longitudinally extending cylindrical connecting rod 106. Each of the pistons 96,98,100,102 are generally threaded onto the opposing ends of the connecting rods 104,106 for ease of assembly into the cylinder bores 84,86.

The fluid pressure intensifier 32 is further characterized, as shown in FIG. 3, by each of the outlet cylinders 90, 94 including a decreasingly tapered cylinder outlet 108, 110, respectively, each forming a partial cone-shaped outlet end. Each of the tapered cylinder outlets 108, 110 is in axial alignment with the first 84 and second 86 bores. The tapered outlet 108 extends from the end portion of the outlet cylinder 90 and decreasingly tapers to the second housing end 76. Similarly, the tapered outlet 110 extends from the end portion of the outlet cylinder 94 and decreasingly tapers to the first housing end 74. Therefore, as the cross-sectional area of the tapered outlets decreases, the fluid flowing therethrough receives an additional pressure amplification.

Also shown in FIGS. 1, 3 and 4, the fluid pressure intensifier 32 further includes fluid reservoir means 112 mounted vertically above the housing 72 and in fluid communication therewith. The fluid reservoir means 112 includes a fluid tank having a fluid filling opening 114 for receiving and storing the incompressible hydraulic fluid, such as any standard hydraulic brake fluid, i.e. DOT 3 or 4. The opening 114 may be closed by a cover 115 and secured by latches 117 as shown in FIG. 4 and commonly known in the art. The tank 112 often includes a fluid level indicator identified schematically at 111. A plurality of conduit means 116 provide a passageway of the incompressible fluid from the fluid reservoir 112 to each of the cylinders 88, 90, 92, 94.

In the embodiment of FIG. 3, each of the conduit means 116 includes a first recess portion 118 and a second narrower elongated cylindrical portion 120 extending from the recess 118 to each of the outlet cylinders 90, 94. The recessed portion 118 receives a check valve, such as a poppet valve as shown at 122, for regulating the flow of fluid from the fluid reservoir 112 to each of the cylinders 88, 90, 92, 94. The check valve 122 may alternatively include any type of fluid valve commonly known in the art. For example, a simple floating ball check valve may be incorporated to close the passageways upon the force of back flow pressure in any of the cylinders.

Alternatively, as shown in FIG. 4, the passageways 120 may have an outlet positioned immediately after or downstream of each of the outlet pistons 100, 102 in the outlet cylinders 90, 94 and further positioned in the end of the inlet cylinders 88, 92 away from the inlet pistons 96, 98. Thus, upon actuation of the intensifier 32, the downstream movement of the pistons 100, 102 closes over the passageways 120 to block any further fluid flow into the cylinders 90, 94 and thus creates a closed system.

Further referring to each of the FIGS. 3 and 4, the fluid pressure intensifier 32 further includes a first partial retaining wall 130 disposed co-axially between the inlet cylinder 88 and outlet cylinder 90 of the first bore 84. As shown in the Figures, the wall 130 has a diameter slightly less than the diameter of the outlet cylinder 90 and slightly larger than the diameter of the first piston connecting rod 104 to slideably receive and guide the rod 104 therethrough. Similarly, a second partial retaining wall 132 is disposed co-axially between the inlet cylinder 92 and outlet cylinder 94 of the second bore 86. The retaining wall 132 likewise comprises a diameter slightly less than the diameter of the outlet cylinder 94 and slightly greater than the diameter of the second piston connecting rod 106 for slideably receiving and guiding the rod 106 therethrough. Spring bias means 134, generally including a common coil spring, is disposed in the inlet cylinder 8 of the first bore 84. The spring bias means 134 is supported at opposite ends between the inlet piston 96 and the first retaining wall 130 for urging the inlet piston 96 towards the housing first end 74. A spring bias means 136, also generally including a common coil spring, is disposed in the inlet cylinder 92 of the second bore 86. The spring bias means 136 is further supported at opposite ends between the inlet piston 98 and the second retaining wall 132 for urging the inlet piston 98 towards the housing second end 76.

Referring again to FIGS. 3 and 4, the inlet pistons 96, 98 and outlet pistons 100, 102 each include sealing means 138 for preventing the passage of the incompressible fluid beyond each of the pistons 96, 98, 100, 102 between each of the inlet and outlet cylinders 88, 90, 94, 94, respectively. The sealing means 138 comprises a resilient O-ring 140 disposed about the perimeter and received in a channel 142 of each of the pistons 96, 98, 100, 102. The sealing means 138 further includes a cylindrical resilient packing 144 compressed on one end of each of the pistons 96, 98, 100, 102 between the end of the piston 96, 98, 100, 102 and a distal end 143 extending longitudinally from each piston end 96, 98, 100, 102.

Figure 7:
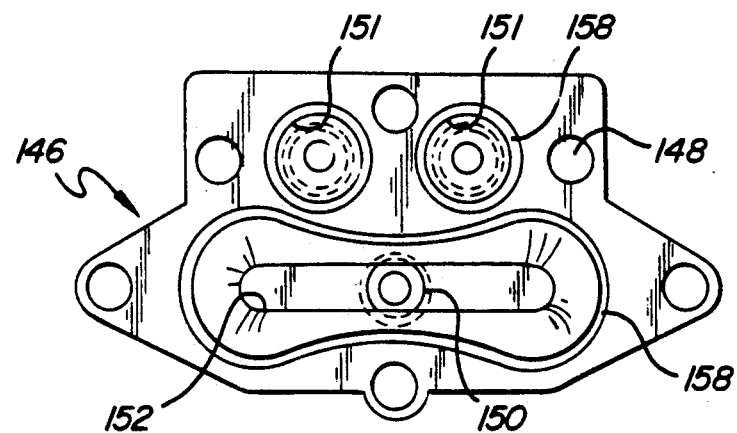
FIG. 7 is an end view of the first end cap of the fluid pressure intensifier of FIG. 1.

Referring to FIGS. 3 and 7, the fluid pressure intensifier 32 is further characterized by including first end cap means 146 for closing the housing first end 74. The first end cap means 146 comprises a generally rectangular plate having apertures 148 therethrough for receiving a fastener, such as a bolt or screw, for securing the end cap 146 to the housing 72. The first end cap 146 includes at least one inlet 150 in fluid communication with the inlet cylinder 88 of the first bore 84. The inlet 150 of the first end cap 146 receives and is secured to the end of the brake fluid line 30 providing pressurized hydraulic fluid from the master operating cylinder 26 to the inlet cylinder 88 of the first bore 84.

As is commonly known, it is quite desirable to maintain positive braking of the vehicle upon partial fluid line failure. Therefore, the brake system generally includes a pair o independent brake lines to supply brake fluid to an opposing pair of wheels of the vehicle. For example, one brake line supplies fluid to the right front and left rear wheel, while the other brake line supplies fluid independently to the left front and right rear wheel. Thus, upon failure of one of the brake lines, the other remains operative.

Therefore, referring to FIG. 5, the preferred embodiment of the intensifier includes a pair of first 84 and second 86 cylinder bores spaced apart in symmetry in the housing 72. Each pair of bores 84, 86 includes the inlet and outlet piston and cylinder arrangement interconnected with a fluid inlet line and fluid outlet line for supplying the pressurized fluid to the pair of opposing wheels. As shown in FIGS. 3 and 5, each of the outlet cylinders 90, 94 includes a fluid passageway or conduit means 116 to provide fluid from the fluid reservoir 112 thereto. However, as can be appreciated, each cylinder 88, 90, 92, 94 may include a fluid passageway 120 as in the system of FIG. 4.

Referring again to FIG. 7, the first end cap 146 may accommodate the symmetrical system by including an elongated fluid channel 152 extending laterally to the housing 72 and in fluid communication with the inlet 150. The fluid channel 152 supplies the pressurized hydraulic fluid simultaneously from the inlet 150 to each of the plurality of inlet cylinders 88 as desired in the fluid pressure intensifier 32. Therefore, only one inlet line from the master cylinder 26 is required to supply fluid to the plurality of cylinders in the intensifier 32 and two outlet lines are provided to supply the pressurized fluid to the paired wheels as previously described.

Figure 6:
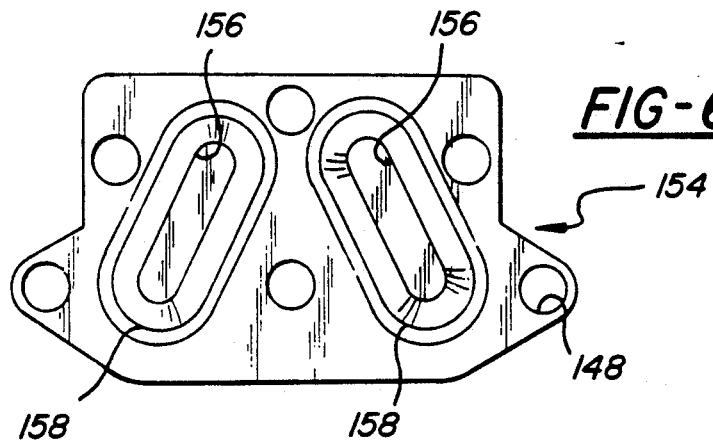
FIG. 6 is an end view of the second end cap of the fluid pressure intensifier of FIG. 1.

Still further, referring to FIG. 6, the fluid pressure intensifier 32 includes second end cap means 154 for closing the housing second end 76. The second end cap 154 is a generally rectangular plate having apertures 156 for receiving fasteners, i.e. bolts, screws, rivets, for securing the end cap 154 to the second end 76. The second end cap 154 comprises a fluid channel 156 for providing a fluid passageway between each of the outlet cylinders 90 of the first bore 84 and the inlet cylinders 92 of the second bore 86. Further, the elongated fluid channel 156 extends vertically diagonal from the outlet cylinder 90 of the first bore 84 to the inlet cylinder 92 of the second bore 86. The diagonal displacement results due to the second bore 86 being spaced above, and laterally offset from the first bore 84 as shown in FIG. 5. This lateral offset displacement of the first 84 and the second 86 bores provides for compact and efficient spacing of the cylinders 88,90,92,94 in the housing means 72 to reduce the overall size and weight of the pressure intensifier 32.

Each of the end caps 146, 154 of FIGS. 6 and 7 further includes sealing means 158 comprising an elongated resilient ovular or circular O-ring disposed about the perimeter of each of the fluid outlets 151 and channels 152, 156 for preventing the flow of fluid from each of the outlets 151 and channels 152, 156.

FIGS. 8 through 14 disclose several alternative embodiments of the master operating cylinder and the fluid pressure intensifier for use in varying types of vehicles. The numerals in the drawings indicate like or corresponding parts with an additional primed or double primed denotation.

FIGS. 8 and 9 disclose a pair of master operating cylinders 26, 26a for use in a vehicle braking system incorporating a pair of independent brake lines for cross-over braking as previously described; i.e. one brake line services the right front and left rear wheels and the other brake line services the left front and right rear wheels. By utilizing two master cylinders 26, 26a, each brake line becomes an independent closed system from the other. Therefore, in the case of failure or leakage from one brake line, the other remaining system remains functional to facilitate in the slowing of the vehicle. Each master cylinder 26,26a includes a brake push rod 24 interconnected by a connecting bar 180 secured at the ends by bolts 182. The brake pedal lever 22 is interconnected by a threaded rod 184 to the connecting bar 180. Thus, upon depression of the brake pedal, the push rods 24 are forced simultaneously to activate each of the master cylinders 26. Each master cylinder 26,26a is similar to the preferred embodiment of FIGS. 1 and 2 by including a piston 40 slideably received in a cylinder 38. Fluid is stored in a reservoir 54 and supplied to the cylinder 38 via a conduit 58. A fluid line (not shown) extends from each of the cylinder outlets 70 to transfer the fluid from the master cylinders 26,26a to a fluid intensifier 32. Thus, as is appreciated, the independent brake lines assure positive braking to at least two wheels upon the failure of one of the brake lines or systems.

Figure 12:
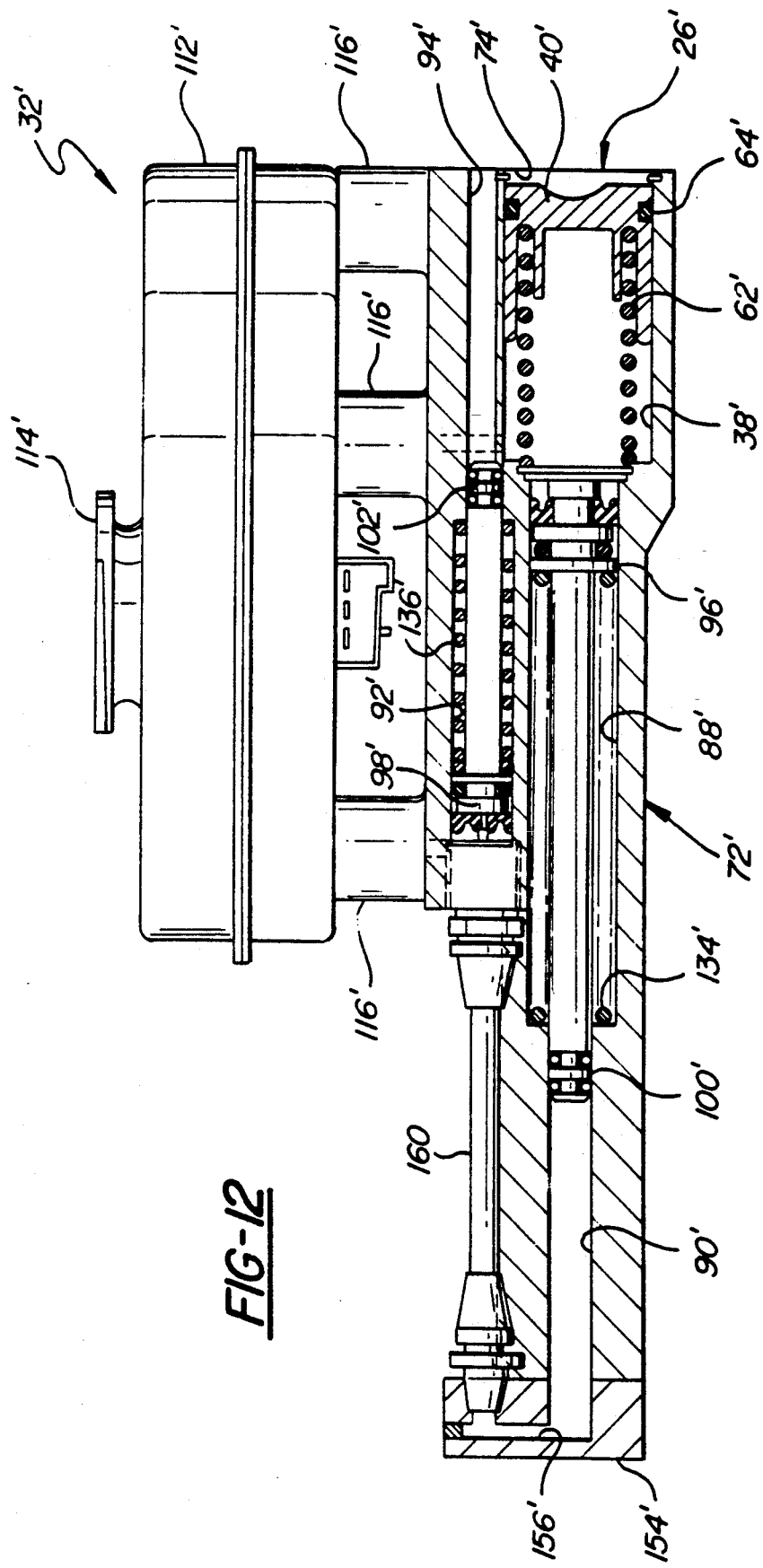
FIG. 12 is a cross-sectional side view of the alternative embodiment of FIG. 10.

FIGS. 10, 11 and 12 disclose a fluid intensifier 32' having the master operating cylinder 26' enclosed within the housing 72' of the intensifier. The intensifier 32' includes a master operating cylinder 38' extending longitudinally from the first end 74' of the housing 72'. A master piston 40' is slideably received in the cylinder 26' and biased toward the first end 74' by a coil spring 62'. A fluid seal is created between the piston 40' and the cylinder walls 38' by a resilient O-ring 64' Hydraulic fluid is stored in a fluid reservoir 112' above the intensifier 32' and flows into the cylinder 26' via conduit means 116'.

The intensifier 32' further includes a pair of secondary inlet 88',92' and outlet 90',94' cylinders slideably receiving inlet 96',98' and outlet 100',102' pistons respectively therein. As shown in FIG. 12, the master cylinder 38' and piston 40' are aligned axially with the first inlet 88' and outlet 90' cylinders. As a result, the overall longitudinal length of the intensifier 32' increases. Therefore, a fluid conduit or tube 160 extends from the second end 76' of the housing 72' to provide a fluid transfer passageway from the outlet cylinder 90' and end channel 156' in the end cap 154' to the second inlet cylinder 92' parallel to the first inlet cylinder 88' The remaining features of the alternative embodiments of FIGS. 10, 11 and 12 remain the same as the preferred embodiment as shown in FIGS. 1 through 3 and described hereinabove.

Still further, referring to FIGS. 13 and 14, an additional alternative embodiment is shown comprising the fluid pressure intensifier 32" of the preferred embodiment with a master operating cylinder 26" mounted on the first end 74" of the housing 72". The assembly provides direct in-line axial attachment between the master cylinder 26" and the intensifier 32". The fluid is similarly supplied fluid via fluid conduits 116" from the fluid reservoir 112" to each of the cylinders within the intensifier 32" and master cylinder 26". Further, as can be appreciated, the outlet of the pressurized fluid exiting the intensifier 32" may be positioned along the side of the housing 72" as indicated at 151" and transverse to the direction of the cylinders to facilitate the attachment of the master cylinder 26".

Figure 15:
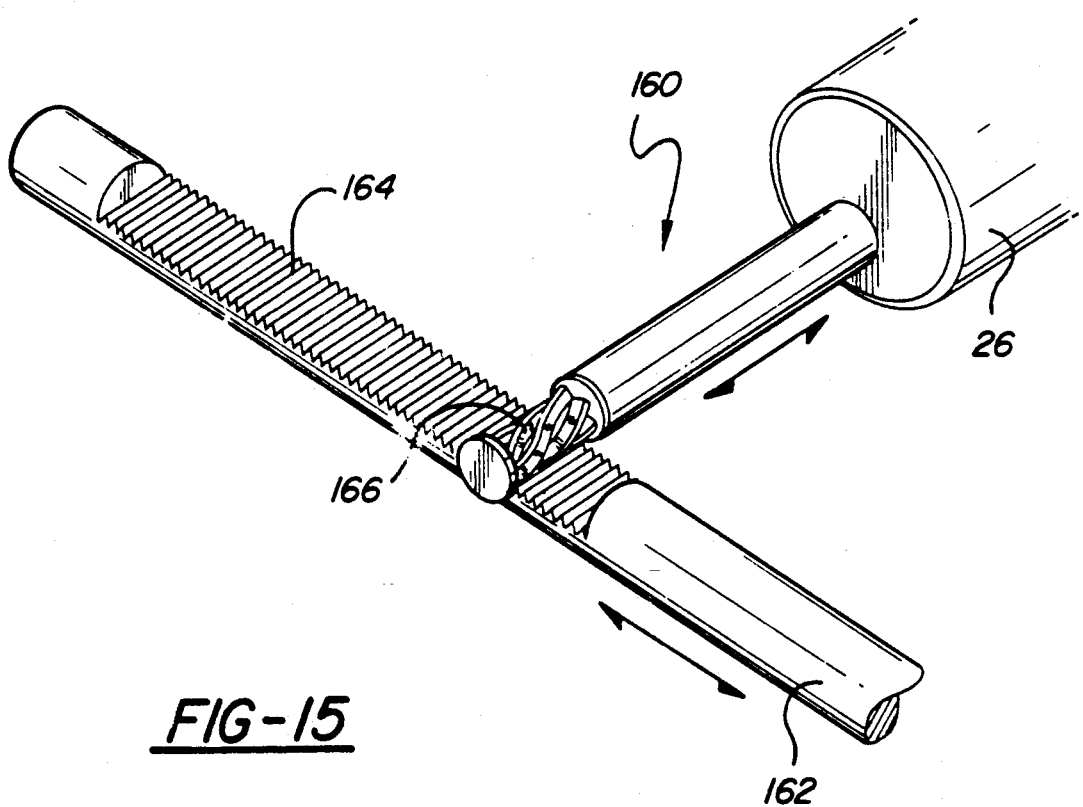
FIG. 15 is a perspective view of the rack and pinion of FIGS. 13 and 14.

Finally, referring to FIGS. 10,11,13,14 and 15, it will be appreciated that any one of the embodiments of the fluid intensifier 32 may be adapted for use in a vehicle incorporating a cross-mounted engine, i.e. a vehicle with the engine mounted transverse to the longitudinal body as is common in a front wheel drive vehicle. The intensifier 32 or master cylinder 26 simply incorporates a rack and pinion system 160 to transfer the longitudinal or axial motion of the pedal push rod 24 to transverse motion to activate the master operating cylinder 26 or intensifier 32. As is commonly known in the art a rack and pinion assembly 160 typically includes, as shown in FIG. 15, a cylindrical push rod 162 with a plurality of spaced apart gear teeth formed along a flat side forming a rack 164 along one end of the rod 162. The teeth along the rack 164 intermesh with a cylindrical pinion 166 generally having a plurality of spiral gears which rotate similar to a screw to transfer the axial motion of the rack 162 to transverse motion of the pinion 166. The pinion 166 may then be connected axially with the master operating cylinder 26 or intensifier 32.

OPERATION OF THE PREFERRED EMBODIMENT

In operation, referring to FIGS. 1 through 4, the vehicle occupant depresses the brake pedal lever 22 to actuate the manual brake system 20. The brake pedal lever 22 extends the brake push rod 24 through the firewall 28 to the master operating cylinder 26. The brake push rod 24 further forces the plunger 42 to extend the master piston 4 axially along the master cylinder 38 from the first end 36 to the second end 37 of the master operating cylinder housing 34. The incompressible hydraulic fluid supplied by the fluid reservoir 54 to the master cylinder 38 increases in pressure and is forced through the master cylinder outlet 70 and into the brake fluid line 30.

The brake fluid line 30 transfers the pressurized hydraulic fluid to the fluid pressure intensifier 32 as shown in FIG. 1. The fluid enters the intensifier 32 through the inlet 150 of the first end cap 146. Depending on the number of cylinder bores in the pressure intensifier 32, the fluid flows through the fluid channel 152 to each of the inlet cylinders 88. The pressurized fluid acts on the inlet piston 96 of the inlet cylinders 88 of the first bore 84 to overcome the biasing force of the spring 134. As the inlet piston 96 is forced axially along the inlet cylinder 88, the first connecting rod 104 forces the outlet piston 100 of the outlet cylinder 90 axially therealong. As previously discussed, as the cross-sectional area of the pistons 96,100 and cylinders 88, 90 decreases the pressure of the fluid supplied by the fluid reservoir means 112 to the outlet cylinder 90 increases. The force of the outlet piston 100 then further forces the fluid through the decreasingly tapered cylinder outlet 108. The fluid channel 156 of the second end cap 154 provides a passageway for the fluid to enter the inlet cylinder 92 of the second bore 86. The pressurized fluid then acts upon the inlet piston 98 seated in the inlet cylinder 92 to overcome the biasing force of the spring bias means 136. As the inlet piston 98 is forced axially along the inlet cylinder 92, the second connecting rod 106 further forces the outlet piston 102 axially along the outlet cylinder 94. The hydraulic fluid supplied by the fluid reservoir means 112 to the outlet cylinder 94 is thus further increasingly pressurized; by the decreasing cross-sectional area of the pistons 98,102 and cylinders 92,94, and forced through the decreasingly tapered cylinder outlet 110. The pressurized fluid is finally expelled from the housing 72 and through the outlet 151 in the first end cap 146. The outlet 151 is further attached to a brake fluid line (not shown) to supply the hydraulic pressurized fluid to a plurality of wheel braking assemblies to decelerate the vehicle.

As can be appreciated, the subject fluid pressure intensifier 32 is not limited for use exclusively in a manual braking system as shown in FIG. 1, but rather may be incorporated in any type of system requiring an increase in fluid pressure with a minimal amount of required input force. For example, the fluid pressure intensifier 32 may also be used in conjunction with a manual steering system of an automotive vehicle. Still further, it will be appreciated that the pressure intensifier 32 may incorporate as many fluid cylinder bores 84, 86 as is desired to supply pressurized fluid to a plurality of components. In other words, each wheel may comprise an independent brake line supplied pressured fluid from a piston/cylinder arrangement as shown and described in the preferred embodiment.

The invention has been described in a illustrative manner, and it is to be understood that the terminology which has been used is intended to be in the nature of words of description rather than that of limitation.

Obviously, many modifications and variations of the present invention are possible in light of the above teachings. It is, therefore, to be understood that within the scope of the appended claims wherein in reference memos are merely for convenience, not to be in any way limiting, the invention may be practiced otherwise than is specifically described.

What is claimed is:

1. A fluid pressure intensifier for increasing the pressure of an incompressible fluid in the braking system of a vehicle comprising:

housing means (72) having a longitudinal axis extending between first (74) and second (76) ends for conveying fluid therethrough;

mounting means (78) for mounting said housing means (72) to the vehicle;

a first bore (84) parallel to said longitudinal axis and extending between said first (74) and second (76) ends;

a second bore (86) spaced from and parallel to said first bore (84) and extending between said first (74) and second (76) ends;

said first bore (84) including an inlet cylinder (88) extending axially from said first end (74) and an outlet cylinder (90) extending axially from said inlet cylinder (88) to said second end (76), said inlet cylinder (88) having a diameter larger than the diameter of said outlet cylinder (90);

said second bore (86) including an inlet cylinder (92) extending axially from said second end (76) and an outlet cylinder (94) extending axially from said inlet cylinder (92) to said first end (74), said inlet cylinder (92) having a diameter larger than the diameter of said outlet cylinder (94);

an inlet piston (96,98) slideably received in each of said inlet cylinders (88,92);

an outlet piston (100,102) slideably received in each of said outlet cylinders (90,94);

fluid reservoir means (112) for storing incompressible fluid;

conduit means (116) for providing passage of the fluid from said fluid reservoir means (112) to each of said cylinders (88,90,92,94);

first end cap means (146) for closing said first end (74) and including at least on inlet (150) in fluid communication with said inlet cylinder (88) of said first bore (84);

second end cap means (154) for closing said second end (76) and including a channel (156) for providing a fluid passageway between said outlet cylinder (90) of said first bore (84) and said inlet cylinder (92) of said second bore (86);

and an outlet (151) in fluid communication with said outlet cylinder (94) of said second bore (86) for discharging the pressurized fluid from said intensifier.

2. A fluid pressure intensifier as set forth in claim 1 further characterized by said inlet cylinder (92) of said second bore (86) having a diameter larger than the diameter of said outlet cylinder (90) of said first bore (84) and smaller than the diameter of said inlet cylinder (88) of said first bore (84).

3. A fluid pressure intensifier as set forth in claim 2 further including a decreasingly tapered cylinder outlet (108,110) extending axially along each of said outlet cylinders (90,94).

4. A fluid pressure intensifier as set forth in claim 2 or 3 further including a first connecting rod (104) interconnecting said inlet (96) and outlet (100) pistons disposed in said first bore (84).

5. A fluid pressure intensifier as set forth in claim 4 further including a second connecting rod (106) interconnecting said inlet (98) and outlet (102) pistons disposed in said second bore (86).

6. A fluid pressure intensifier as set forth in claim 5 further including a first partial retaining wall (130) disposed coaxially between said inlet (88) and outlet (90) cylinder of said first bore (84).

7. A fluid pressure intensifier as set forth in claim 6 further including a second partial retaining wall (132) disposed coaxially between said inlet (92) and outlet (94) cylinder of said second bore (86).

8. A fluid pressure intensifier as set forth in claim 7 further including spring bias means (134) disposed in said inlet cylinder (88) of said first bore (84) and supported between said inlet piston (96) and said first retaining wall (130) for urging said inlet piston (96) toward said housing first end (74).

9. A fluid pressure intensifier as set forth in claim 8 further including spring bias means (136) disposed in said inlet cylinder (92) of said second bore (86) and supported between said second retaining wall (132) and said inlet piston (98) for urging said inlet piston (98) toward said housing second end (76).

10. A fluid pressure intensifier as set forth in claim 9 wherein each of said pistons (96,98,100,102) further includes sealing means (138) for preventing the passage of the incompressible fluid about said pistons (96,98,100,102).

11. A fluid pressure intensifier as set forth in claim 10 wherein said sealing means (138) further includes a resilient O-ring (140) disposed about the perimeter of each of said pistons (96,98,100,102) and a resilient packing (144) disposed on the outside end of each of said pistons (96,98,100,102).

12. A fluid pressure intensifier as set forth in claim 11 wherein said conduit means (116) further includes a plurality of cylindrical passageways (120) extending vertically downwardly from said fluid reservoir means (112) to each of said inlet (88,92) and outlet (90,94) cylinders.

13. A fluid pressure intensifier as set forth in claim 12 wherein said conduit means (116) further includes check valve means (122) for regulating the flow of fluid from said fluid reservoir means (112) to each of said outlet cylinders (90,94).

14. A fluid pressure intensifier as set forth in claim 13 wherein said first end cap means (146) further includes an elongated fluid channel (152) in fluid communication with said fluid inlet (150) for supplying pressurized fluid simultaneously from said inlet (150) to a plurality of inlet cylinders (88).

15. A fluid pressure intensifier as set forth in claim 14 wherein said second end cap means (154) further includes an elongated fluid channel (156) extending vertically diagonal from said outlet cylinder (90) of said first bore (84) to said inlet cylinder (92) of said second bore (86), said second bore (86) spaced vertically above and laterally offset from said first bore (84), and said channel (156) supplying fluid therebetween.

16. A fluid pressure intensifier as set forth in claim 15 wherein each of said fluid channels (152,156) of said end caps (152,154) further includes sealing means (158) for preventing the flow of fluid from each of said channels (152,156).

17. A fluid pressure intensifier as set forth in claim 16 further characterized by including a first fluid inlet line (30) having a first end in fluid communication with said inlet (150) of said first end cap means (146) and a second end in upstream fluid communication with a first master operating cylinder (26) for supplying pressurized fluid to said intensifier (32).

18. A fluid pressure intensifier as set forth in claim 17 further characterized by including a second fluid inlet line having a first end in fluid communication with said inlet (150) of said first end cap means (146) and a second end in upstream fluid communication with a second master operating cylinder (26a) for supplying pressurized fluid to said intensifier (32).

19. A fluid pressure intensifier as set forth in claim 18 further characterized by each of said first (26) and second (26a) master operating cylinder including a longitudinal master cylinder bore (38) extending between first (36) and second (37) ends and slideably receiving a master piston (40) therein.

20. A fluid pressure intensifier as set forth in claim 19 further characterized by each of said first (26) and second (26a) master operating cylinders including a push rod (24) interconnected to said master piston (40) and extending longitudinally through said first end (36).

21. A fluid pressure intensifier as set forth in claim 2 further characterized by each of said push rods (24) interconnected by a connecting bar (180).

22. A fluid pressure intensifier as set forth in claim 21 further characterized by including a lever (22) connected to said connecting rod (180) to simultaneously force said each of said push rods (24) and master pistons (40) longitudinally through said master cylinder bore (38).

23. A fluid pressure intensifier as set forth in claim 22 further characterized by each of said master operating cylinders (26,26a) including a fluid line (30) extending from said second end (37) to said fluid intensifier housing means (72).

24. A fluid pressure intensifier as set forth in claim 23 further characterized by each of said master operating cylinders (26,26a) including a fluid reservoir (54) for supplying hydraulic fluid via a conduit (58) to each of said master cylinder bores (38).

* * * * *